US012223973B1

(12) United States Patent
Sima et al.

(10) Patent No.: US 12,223,973 B1
(45) Date of Patent: Feb. 11, 2025

(54) SPEECH CONVERSION METHOD AND APPARATUS, STORAGE MEDIUM, AND ELECTRONIC DEVICE

(71) Applicant: NANJING SILICON INTELLIGENCE TECHNOLOGY CO., LTD., Nanjing (CN)

(72) Inventors: Huapeng Sima, Nanjing (CN); Ao Yao, Nanjing (CN); Yiping Tang, Nanjing (CN)

(73) Assignee: NANJING SILICON INTELLIGENCE TECHNOLOGY CO., LTD., Nanjing (CN)

(*) Notice: Subject to any disclaimer, the term of this patent is extended or adjusted under 35 U.S.C. 154(b) by 0 days.

(21) Appl. No.: 18/798,929

(22) Filed: Aug. 9, 2024

(30) Foreign Application Priority Data

Dec. 28, 2023 (CN) .......................... 202311826046.4

(51) Int. Cl.
*G10L 13/033* (2013.01)
*G10L 15/02* (2006.01)
*G10L 15/06* (2013.01)
*G10L 15/18* (2013.01)
*G10L 21/007* (2013.01)

(52) U.S. Cl.
CPC ............ *G10L 21/007* (2013.01); *G10L 15/02* (2013.01); *G10L 15/063* (2013.01); *G10L 15/1807* (2013.01); *G10L 2015/0631* (2013.01)

(58) Field of Classification Search
CPC ....... G10L 13/033; G10L 13/02; G10L 13/00; G10L 13/10; G10L 2021/0135; G10L 15/063; G10L 21/007; G10L 15/02; G10L 15/1807; G10L 2015/0631; G06F 21/32; G06F 40/58
See application file for complete search history.

(56) References Cited

U.S. PATENT DOCUMENTS 10,008,193 B1 * 6/2018 Harvilla .................... G10H 1/20
10,671,838 B1 * 6/2020 Bogan, III ............ G06T 11/001
(Continued)

FOREIGN PATENT DOCUMENTS

| CN | 112863483 A | 5/2021 |
|---|---|---|
| CN | 113470664 A | 10/2021 |

(Continued)

*Primary Examiner* — Jakieda R Jackson
(74) *Attorney, Agent, or Firm* — Laine IP Oy

(57) ABSTRACT

Embodiments of the present application provide a speech conversion method and apparatus, a storage medium, and an electronic device. The method includes: acquiring a source speech to be converted and a target speech sample of a target speaker; recognizing a style category of the target speech sample, and extracting a target audio feature from the target speech sample according to the style category; extracting a source audio feature from the source speech; acquiring a first style feature of the target speech sample and determining a second style feature of the target speech sample according to the first style feature; fusing and mapping the source audio feature, the target audio feature, and the second style feature to obtain a joint encoding feature; and decoding the joint encoding feature, to obtain a target speech feature, and converting the source speech based on the target speech feature to obtain a target speech.

7 Claims, 4 Drawing Sheets

(56) References Cited

U.S. PATENT DOCUMENTS

| | | | |
|---|---|---|---|
| 11,545,134 B1* | 1/2023 | Federico | G10L 13/033 |
| 11,977,816 B1* | 5/2024 | Sepasi Ahoei | G06F 40/134 |
| 2009/0204395 A1* | 8/2009 | Kato | G10L 13/033 |
| | | | 704/E11.001 |
| 2010/0070283 A1* | 3/2010 | Kato | G10L 21/02 |
| | | | 704/E21.001 |
| 2012/0059654 A1 | 3/2012 | Nishimura et al. | |
| 2013/0218568 A1* | 8/2013 | Tamura | G10L 13/06 |
| | | | 704/260 |
| 2019/0221201 A1* | 7/2019 | Yuan | G10L 15/08 |
| 2019/0318722 A1* | 10/2019 | Bromand | G10L 15/063 |
| 2020/0027440 A1* | 1/2020 | Kilgore | G10L 13/0335 |
| 2021/0056348 A1* | 2/2021 | Berlin | G06T 11/60 |
| 2021/0280202 A1* | 9/2021 | Wang | G10L 25/30 |
| 2022/0068257 A1* | 3/2022 | Biadsy | G10L 13/08 |
| 2022/0122579 A1* | 4/2022 | Biadsy | G10L 25/30 |
| 2022/0148613 A1 | 5/2022 | Xiao et al. | |
| 2022/0180043 A1* | 6/2022 | Tang | G06V 30/19147 |
| 2022/0293086 A1* | 9/2022 | Marchini | G06N 20/00 |
| 2022/0293091 A1* | 9/2022 | Pan | G10L 25/63 |
| 2022/0335925 A1* | 10/2022 | Zhou | G10L 13/033 |
| 2023/0081659 A1* | 3/2023 | Pan | G10L 13/033 |
| | | | 704/259 |
| 2023/0223006 A1* | 7/2023 | Fan | H04M 1/72403 |
| | | | 704/231 |
| 2023/0260502 A1* | 8/2023 | Gabrys | G10L 19/16 |
| | | | 704/260 |
| 2023/0298565 A1* | 9/2023 | Rosenberg | G10L 21/003 |
| | | | 704/235 |
| 2023/0343321 A1* | 10/2023 | Ding | G10H 1/0033 |
| 2023/0368777 A1* | 11/2023 | Zhao | G10L 15/02 |
| 2023/0386475 A1* | 11/2023 | Frenzel | G10L 17/04 |
| 2024/0105207 A1* | 3/2024 | Kruk | G10L 13/033 |

FOREIGN PATENT DOCUMENTS

| | | |
|---|---|---|
| CN | 114495956 A | 5/2022 |
| CN | 114842859 A | 8/2022 |
| CN | 115294995 A | 11/2022 |
| CN | 115985333 A | 4/2023 |
| CN | 116564322 A | 8/2023 |

* cited by examiner

SPEECH CONVERSION METHOD AND APPARATUS, STORAGE MEDIUM, AND ELECTRONIC DEVICE

CROSS-REFERENCE TO RELATED APPLICATIONS

This application claims priority to and the benefit of Chinese Patent Application No. 202311826046.4, filed with the China National Intellectual Property Administration (CNIPA) on Dec. 28, 2023, the entire disclosure of which is incorporated by reference in its entirety herein.

FIELD OF THE INVENTION

The present application relates to the field of data processing technology, and more specifically, to a speech conversion method and apparatus, a storage medium, and an electronic device.

BACKGROUND OF THE INVENTION

At present, a main way of voice conversion in the related technology is to first recognize a speech to be converted by Automatic Speech Recognition (ASR) technology and extract Backus-Naur form (BNF) features, and then further perform a process of speech synthesis based on the above recognized content and BNF features by Text To Speech (TTS) technology to obtain a target speech. The above process is limited by a recognition accuracy and an efficiency of ASR, and in the actual processing, both the accuracy and a real-time performance of voice conversion are not ideal. In this regard, the related technology further proposes an end-to-end voice conversion method, i.e., to directly achieve timbre conversion for the speech to be converted, without ASR for speech recognition, and then obtain the target speech. However, the prior end-to-end speech conversion method has many deficiencies in timbre conversion, and cannot ideally reproduce the timbre of the target speaker.

With respect to the problem that the end-to-end voice conversion method in the related technology has more deficiencies in the timbre conversion and cannot ideally reproduce the timbre of the target speaker, an effective solution has not yet been proposed in the related technology.

SUMMARY OF THE INVENTION

Embodiments of the present application provide a speech conversion method and apparatus, a storage medium, and an electronic device, so as to at least solve the problem that the end-to-end voice conversion method in the related technology has more deficiencies in the timbre conversion and cannot ideally reproduce the timbre of the target speaker.

In an embodiment of the present application, there is provided a speech conversion method including:
acquiring a source speech to be converted and a target speech sample of a target speaker;
recognizing a style category of the target speech sample by an audio feature encoding module, and extracting a target audio feature from the target speech sample according to the style category of the target speech sample, wherein the target audio feature includes a textual feature, a prosodic feature and a timbre feature of the target speech sample;
extracting a source audio feature from the source speech by the audio feature encoding module, wherein the source audio feature includes a textual feature, a prosodic feature and a timbre feature of the source speech;
acquiring a first style feature of the target speech sample by a style feature encoding module and determining a second style feature of the target speech sample according to the first style feature, wherein the first style feature is used to indicate a static voice characteristic of the target speech sample, and the second style feature is used to indicate predicted values for a feature bias amount and a gain amount of the first style feature within a preset duration;
fusing and mapping the source audio feature of the source speech, the target audio feature of the target speech sample, and the second style feature of the target speech sample to obtain a joint encoding feature;
decoding the joint encoding feature on which a standard streaming operation is performed, to obtain a target speech feature corresponding to a speaking style of the target speaker, and converting the source speech based on the target speech feature to obtain a target speech.

In an embodiment, the extracting audio features from the source speech by the audio feature encoding module, the method includes:
training a first clustering model by using first training samples, wherein the first training samples include speech samples of a plurality of speakers, and the speech samples of the plurality of speakers correspond to different style types, and wherein the first clustering model is configured for clustering the first training samples and determining, according to a result of the clustering, category labels corresponding to the first training samples;
training a second clustering model by using second training samples, wherein the second training samples include speech samples of a plurality of speakers, and the speech samples of the plurality of speakers correspond to different style types, and wherein the second clustering model is configured for clustering the second training samples and determining, according to a result of the clustering, category labels corresponding to the second training samples, the first clustering model and the second clustering model using different structures of feature extractors to perform clustering from different dimensions;
inputting third training samples into the trained first clustering model, the trained second clustering model, and an initial audio feature encoding module, wherein the third training samples include speech samples of a plurality of speakers;
training the initial audio feature encoding module according to a loss function for the initial audio feature encoding module, and training the initial audio feature encoding module to convergence according to actual category labels output from the first clustering model and the second clustering model and the predicted category labels output from the initial audio feature encoding module to obtain the audio feature encoding module, wherein the audio feature encoding module is configured for performing audio feature extraction based on the style type of speech.

In an embodiment, the training the initial audio feature encoding module according to a loss function for the initial audio feature encoding module includes:
training the initial audio feature encoding module by a formula of a loss function as follows:

$$p(d_t = i|s_t) = \frac{\exp(\text{sim}(s_t, e_i)/\tau)}{\sum_{k=1}^{K} \exp(\text{sim}(s_t, e_k)/\tau)}$$

where p denotes a probability, i denotes an identity of the clustering category, $s_t$ denotes a target vector, $d_t$ denotes a probability that a current feature vector satisfies the target vector and belongs to a category i, $e_i$ denotes a trainable feature vector under the current category i, sim (·,·) denotes calculation of cosine similarity, τ denotes a hyperparameter, K denotes a number of clustering categories, and $e_k$ denotes a trainable feature vector under clustering category k.

In an embodiment, the training the initial audio feature encoding module to convergence based on the actual category labels output from the first clustering model and the second clustering model and the predicted category labels output from the initial audio feature encoding module includes:

initializing a feature encoding unit and a category mapping unit of the initial audio feature encoding module;

extracting and encoding audio features from the third training samples by the feature encoding unit, and mapping the audio features extracted by the feature encoding unit to the respective category codes by the category mapping unit to, obtain predicted category labels corresponding to the third training samples;

outputting the predicted category labels from the category encoding unit of the initial audio feature encoding module, and training the initial audio feature encoding module to convergence based on the predicted category labels and the actual category labels output from the first clustering model and the second clustering model.

In an embodiment, the training the initial audio feature encoding module to convergence based on the predicted category labels and the actual category labels output from the first clustering model and the second clustering model includes:

minimizing a first average cross entropy of the actual category labels output from the first clustering model and the predicted category labels and minimizing a second average cross entropy of the actual category labels output from the second clustering model and the predicted category labels, and updating a loss function for the initial audio feature encoding module based on the minimized first average cross entropy and the minimized second average cross entropy and updating training parameters of the initial audio encoding module.

In another embodiment of the present application, there is also provided a speech conversion apparatus including:

a first acquisition module configured to acquire a source speech to be converted and a target speech sample of a target speaker;

a first extraction module configured to recognize a style category of the target speech sample by an audio feature encoding module, and extract a target audio feature from the target speech sample according to the style category of the target speech sample, wherein the target audio feature includes a textual feature, a prosodic feature and a timbre feature of the target speech sample;

a second extraction module configured to extract a source audio feature from the source speech by the audio feature encoding module, wherein the source audio feature includes a textual feature, a prosodic feature and a timbre feature of the source speech;

a second acquisition module configured to acquire a first style feature of the target speech sample by a style feature encoding module and determine a second style feature of the target speech sample according to the first style feature, wherein the first style feature is used to indicate a static voice characteristic of the target speech sample, and the second style feature is used to indicate predicted values for a feature bias amount and a gain amount of the first style feature within a preset duration;

a fusing and mapping module configured to fuse and map the source audio feature of the source speech, the target audio feature of the target speech sample, and the second style feature of the target speech sample to obtain a joint encoding feature;

a conversion module configured to decode the joint encoding feature on which a standard streaming operation is performed, to obtain a target speech feature corresponding to a speaking style of the target speaker; and convert the source speech based on the target speech feature to obtain a target speech.

In an embodiment of the present application, there is also proposed a computer-readable storage medium, on which a computer program is stored, wherein the computer program is configured to perform, when being executed, the steps in any the above embodiments of the methods.

In an embodiment of the present application, there is also proposed an electronic device including a memory on which a computer program is stored and a processor, wherein the processor is configured to execute the computer program to perform the steps in any of the above embodiments of the methods.

According to the embodiments of the present application, acquiring a source speech to be converted and a target speech sample of a target speaker; recognizing a style category of the target speech sample by an audio feature encoding module, and extracting a target audio feature from the target speech sample according to the style category of the target speech sample; extracting a source audio feature from the source speech by the audio feature encoding module; acquiring a first style feature of the target speech sample by a style feature encoding module and determining a second style feature of the target speech sample according to the first style feature; fusing and mapping the source audio feature of the source speech, the target audio feature of the target speech sample, and the second style feature of the target speech sample to obtain a joint encoding feature; and decoding the joint encoding feature on which a standard streaming operation is performed, to obtain a target speech feature corresponding to a speaking style of the target speaker, and converting the source speech based on the target speech feature to obtain a target speech, solving the problem that the end-to-end voice conversion method in the related technology has more deficiencies in the timbre conversion and cannot ideally reproduce the timbre of the target speaker. Through recognizing a style category of the target speech sample by an audio feature encoding module, and fusing and mapping the source audio feature of the source speech, the target audio feature of the target speech sample, and the second style feature of the target speech sample, the speaking style of the target speaker may be effectively recognized, and the source speech to be converted may be converted in accordance with the speaking style of the target speaker, and the timbre of the target speaker may be effectively reproduced.

BRIEF DESCRIPTION OF THE DRAWINGS

The accompanying drawings described herein are used for a further understanding of the present application, as a part thereof, and the schematic embodiments of the present application and the description thereof are used for explaining the present application and do not be construed to limit the present application. In the accompanying drawings.

DETAILED DESCRIPTION OF THE EMBODIMENTS

In the following, the present application will be described in detail with reference to the accompanying drawings and in conjunction with embodiments. It should be noted that the embodiments and the features in the embodiments in the present application may be combined with each other without conflict.

It should be noted that the terms "first", "second", etc. in the description and claims of the present application and in the above-mentioned accompanying drawings are used to distinguish between similar objects, and are not used necessarily to describe a particular order or sequence.

Figure 1:
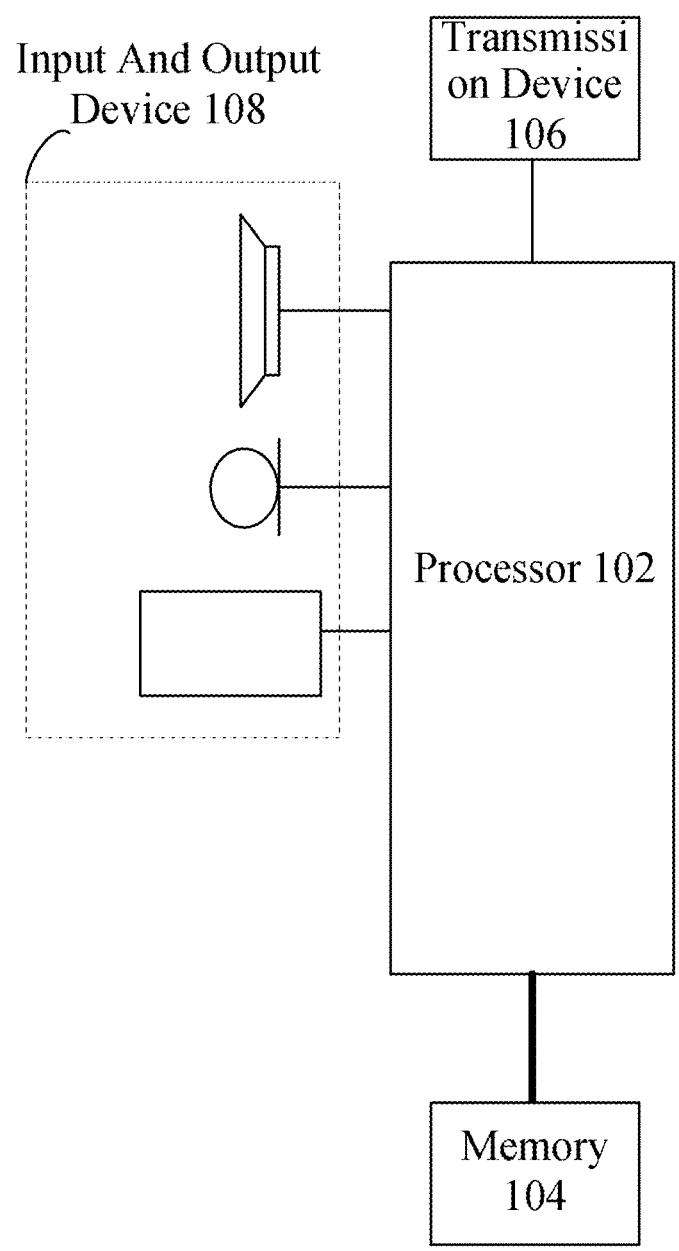
FIG. 1 is a block diagram illustrating a hardware structure of a mobile terminal for a speech conversion method of an embodiment of the present application.

The method embodiments provided in the embodiments of the present application may be implemented in a mobile terminal, a computer terminal, or a similar computing device. As an example of implementation on a mobile terminal, FIG. 1 is a block diagram illustrating a hardware structure of a mobile terminal for a speech conversion method according to an embodiment of the present application. As shown in FIG. 1, the mobile terminal may include one or more (only one shown in FIG. 1) processors 102 (the processor 102 may include, but is not limited to, a processing device such as a microprocessor MCU or a programmable logic device FPGA, etc.) and a memory 104 for storing data, wherein the aforesaid mobile terminal may also include a transmission device 106 for a communication function, and an input and output device 108. As may be understood by a person of ordinary skill in the art, the structure shown in FIG. 1 is merely schematic, and does not be construed to limit the structure of the above-described mobile terminal. For example, the mobile terminal may also include more or fewer components than shown in FIG. 1, or have a configuration different from that shown in FIG. 1.

The memory 104 may be used to store a computer program, e.g., a software program for an application software, and a module, such as a computer program corresponding to a training method for a speech conversion model, a clustering model, an audio feature encoding module, or a style encoding module in an embodiment of the present application, and the processor 102 performs various functional applications as well as data processing by executing the computer program stored in the memory 104, i.e. implementing the method described above. The memory 104 may include a high-speed random memory, and may also include a non-volatile memory, such as one or more magnetic memory devices, flash memory, or other non-volatile solid state memory. In some examples, the memory 104 may further include memories, arranged remotely relative to the processor 102, which may be connected to the mobile terminal via a network. Examples of the networks include, but are not limited to, the Internet, an enterprise intranet, a local area network, a mobile communication network, and combinations thereof.

The transmission device 106 is used to receive or transmit data via a network. Specific examples of the network described above may include a wireless network according to a communication provider for the mobile terminal. In one example, the transmission device 106 includes a Network Interface Controller (NIC) that may be connected to other network devices via a base station so as to communicate with the Internet. In one example, the transmission device 106 may be a Radio Frequency (RF) module for communicating wirelessly with the Internet.

Figure 2:
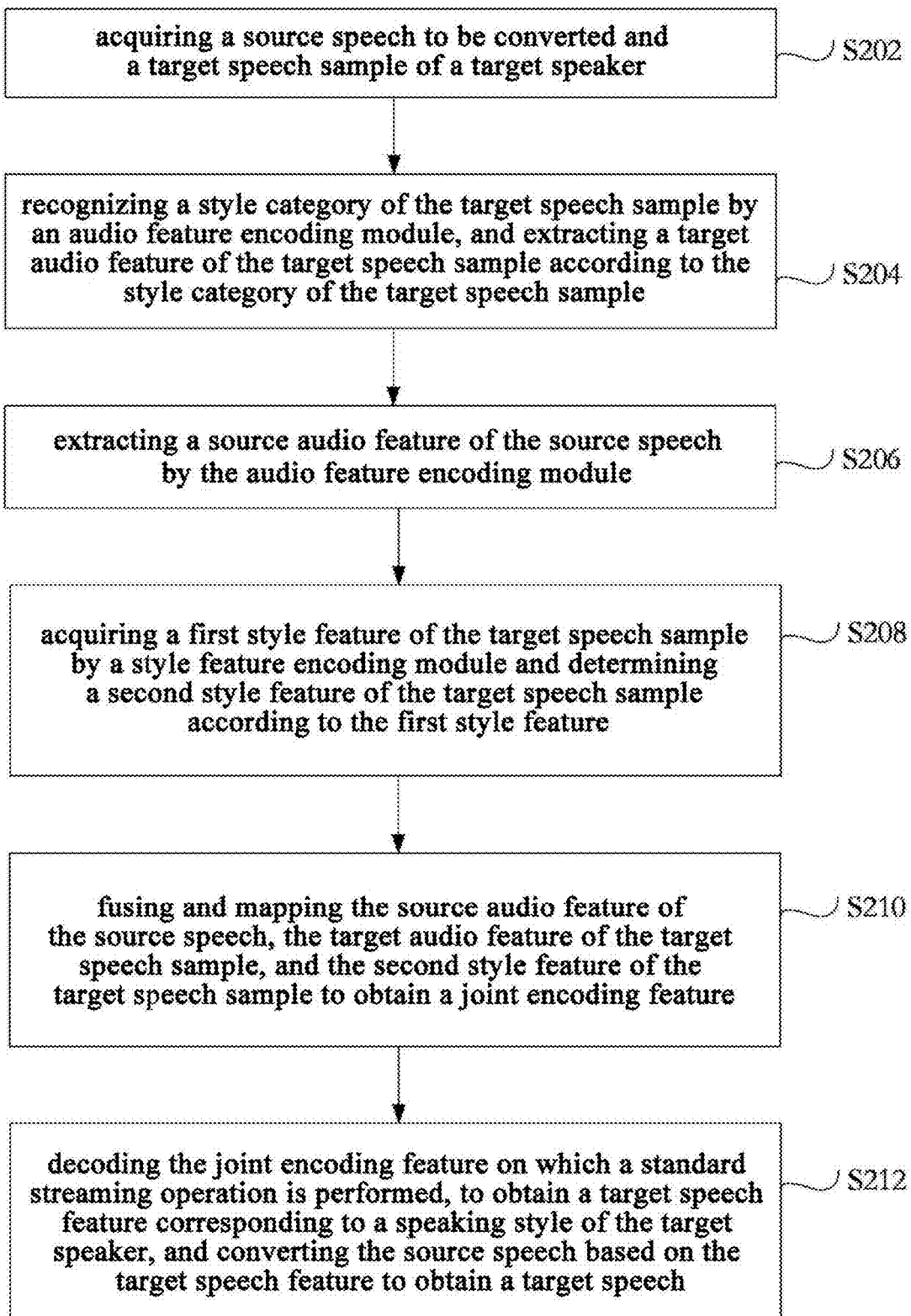
FIG. 2 is a flowchart illustrating an optional speech conversion method according to an embodiment of the present application.

FIG. 2 is a flowchart illustrating an optional speech conversion method according to an embodiment of the present application. As shown in FIG. 2, the speech conversion method according to an embodiment of the present application includes:

Step S202, acquiring a source speech to be converted and a target speech sample of a target speaker;

Step S204, recognizing a style category of the target speech sample by an audio feature encoding module, and extracting a target audio feature of the target speech sample according to the style category of the target speech sample, wherein the target audio feature includes a textual feature, a prosodic feature and a timbre feature of the target speech sample;

Step S206, extracting a source audio feature of the source speech by the audio feature encoding module, wherein the source audio feature includes a textual feature, a prosodic feature and a timbre feature of the source speech;

Step S208, acquiring a first style feature of the target speech sample by a style feature encoding module and determining a second style feature of the target speech sample according to the first style feature, wherein the first style feature is used to indicate a static voice characteristic of the target speech sample, and the second style feature is used to indicate predicted values for a feature bias amount and a gain amount of the first style feature within a preset duration;

Step S210, fusing and mapping the source audio feature of the source speech, the target audio feature of the target speech sample, and the second style feature of the target speech sample to obtain a joint encoding feature;

Step S212, decoding the joint encoding feature on which a standard streaming operation is performed, to obtain a target speech feature corresponding to a speaking style of the target speaker, and converting the source speech based on the target speech feature to obtain a target speech.

It should be noted that the target speech sample may be input during the conversion process, for example, if a user wants to targetedly convert his or her own voice to another specific person's voice, the user may input a piece of speech data of a target speaker after inputting his or her source speech. The target speech sample may also be input in advance in a training process. For example, a model may be trained in advance with the speeches of several types of typical target speakers, and in a subsequent use process, the user just needs to select by tap a corresponding one of the target speakers, and then a voice conversion may be achieved.

It should be noted that in inference and use phases, the audio feature encoding module no longer perform recognition on the source speech, but needs to perform recognition on the target speech sample, and perform feature extraction based on the style type of the target speech sample, wherein different encoding manners may be used to extract the target audio feature of the target speech sample for different style types, so as to achieve the effect of improving the targeting of the voice transformation.

In an embodiment, before the extracting audio features from the source speech by the audio feature encoding module, the method further includes:

training a first clustering model by using first training samples, wherein the first training samples include speech samples of a plurality of speakers, and the speech samples of the plurality of speakers correspond to different style types, and wherein the first clustering model is configured for clustering the first training samples and determining, according to a result of the clustering, category labels corresponding to the first training samples;

training a second clustering model by using second training samples, wherein the second training samples include speech samples of a plurality of speakers, and the speech samples of the plurality of speakers correspond to different style types, and wherein the second clustering model is configured for clustering the second training samples and determining, according to a result of the clustering, category labels corresponding to the second training samples, the first clustering model and the second clustering model using different structures of feature extractors to perform clustering from different dimensions;

inputting third training samples into the trained first clustering model, the trained second clustering model, and an initial audio feature encoding module, wherein the third training samples include speech samples of a plurality of speakers;

training the initial audio feature encoding module according to a loss function for the initial audio feature encoding module, and training the initial audio feature encoding module to convergence according to actual category labels output from the first clustering model and the second clustering model and the predicted category labels output from the initial audio feature encoding module to obtain the audio feature encoding module, wherein the audio feature encoding module is configured for performing audio feature extraction based on the style type of speech.

It should be noted that in the related technology the main method of the extraction of audio features is to extract audio features through large-scale self-supervised models such as softhubert, hubert, wav2vec2.0, etc., which may obtain richer features and knowledge, but, analyzing from the perspective of the final results of voice transformation, the timbre of the target speech does not well reflect the target speaker's timbre characteristics or personalization of the target speaker's speech. Specifically, the above audio feature extraction method does not perform targeted processing for the timbre characteristics of the target speaker, so if the timbre of the target speaker is more extreme, for example, some singers with special voices, the above audio feature extraction method may result in a certain degree of "averaging" of the timbre of the target speaker during training, that is, the timbre of the target speaker tends to be similar to the timbre of other speakers, and thus the timbre of the target speaker cannot be more completely reflected, and correspondingly, the final results of voice conversion cannot achieve the desired effect. Therefore, the method of performing audio feature extraction directly by large-scale self-supervised model in the related technology still has certain defects in the style conversion effect.

For the above defects, according to the embodiments of the present application, a cluster process is performed, based on a pre-trained clustering model, in a process of the audio feature extraction performed by the audio feature encoding module, improving the quality of the features and the effect of the voice conversion through clustering of the features, as follows.

In a first step, two clustering models are pre-set up, namely the first clustering model and the second clustering model described above, and the two clustering models described above may be k-means model, but are not limited to this (K-means clustering, hierarchical clustering (SPSS), and DBSCAN clustering (MATLAB) are all possible). The first clustering model and the second clustering model described above include a feature extractor for performing feature extraction during the training of the clustering model, and the feature extractors of the first clustering model and the second clustering model may be any two of the above-described three models of softhubert, hubert, and wav2vec2.0, e.g., the feature extractor of the first clustering model adopts hubert, the feature extractor of the second clustering model adopts wav2vec2.0, where the first clustering model adopts the feature extractor different from the second clustering model.

In a second step, the first clustering model and the second clustering model are pre-trained by the general training data, and the general training data may be based on LibriSpeech-960 and AISHELL-3 data, in particular, the speech samples of 200 speakers are acquired, respectively, and the number of clusters is 200. The trainings of the first clustering model and the second clustering model are achieved by using the above-described general training data, where the purpose of the training here is to enable the two clustering models to classify speech samples of different speakers. The two clustering models, respectively using different feature extractors, may perform clustering from different dimensions, where different feature extraction methods have their own advantages in terms of timbre, prosody, rhythm in speech, and so on. Therefore, the combination of these different feature extractions may make the subsequent training and inferring process of the voice transformation system have richer effects.

In the training process of the clustering model, it is necessary to artificially perform category encoding the categories of the clusters. For example, the first clustering model performs clustering on speech sample data to obtain different categories, to which ID1.1, ID1.2, . . . ID1.9, and so on may be assigned, respectively; and similarly, the second clustering model performs clustering on speech sample data to obtain different categories, to which ID2.1, ID2.2, . . . ID2.9, and so on may be assigned, respectively. Here, the purpose of the category encoding is to make each of the categories after the clustering is performed by the clustering model have a unique identity for distinguishing, so as to facilitate the mapping and encoding of the categories in the subsequent training process of the voice transformation system.

It should be noted that the training of the clustering model involved in the embodiments of the present application is an unsupervised training method, that is, the samples are clustered purely on the basis of their similarity without relying on labels. The first training samples themselves have no category labels, and after performing clustering on them, category labels are then artificially assigned for different types of sample sets. Meanwhile, the same category label corresponds not necessarily to the same speaker, but to speech of similar styles. For example, the first training samples including 100 speeches, all of which are samples of different speakers, may be divided into 10 sample sets by the clustering model, each sample set corresponds to a certain style type, such as husky male voice, clear female voice, etc., and then these 10 sample sets are artificially assigned with the corresponding category labels.

In an embodiment, training the initial audio feature encoding module according to a loss function for the initial audio feature encoding module includes:

training the initial audio feature encoding module by a formula of a loss function as follows:

$$p(d_t = i|s_t) = \frac{\exp(\text{sim}(s_t, e_i)/\tau)}{\sum_{k=1}^{K} \exp(\text{sim}(s_t, e_k)/\tau)}$$

where p denotes a probability, i denotes an identity of the clustering category, $s_t$ denotes a target vector, $d_t$ denotes a probability that a current feature vector satisfies the target vector and belongs to a category i, $e_i$ denotes a trainable feature vector under the current category i, sim (·,·) denotes calculation of cosine similarity, $\tau$ denotes a hyperparameter, K denotes a number of clustering categories, and $e_k$ denotes a trainable feature vector under clustering category k.

Figure 3:
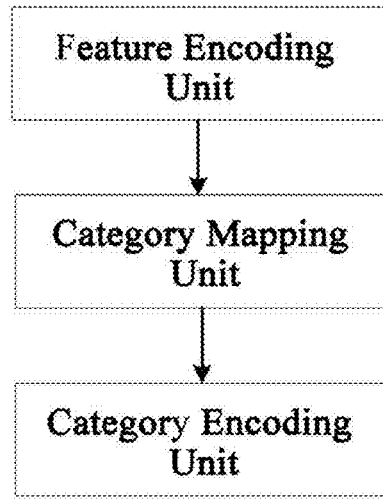
FIG. 3 is a schematic diagram illustrating a structure of an optional audio feature encoding module according to an embodiment of the present application.

FIG. 3 is a schematic diagram illustrating a structure of an optional audio feature encoding module according to an embodiment of the present application. It is to be noted that the audio feature encoding module of the embodiment of the present application may include the following three units, as shown in FIG. 3.

Feature encoding unit (backbone network) configured for performing audio feature extraction and encoding based on a structure of a hubert network as a feature encoding network.

Category mapping unit (linear projection), including a mapping layer, configured for mapping to the category code, that is, for mapping of the audio features extracted by the feature encoding unit to the respective category codes.

Category encoding unit (speech units), including an embedding layer, configured for assigning the category codes from the aforementioned clustering model to the audio features extracted by the feature encoding unit during the training process of the audio feature encoding module.

In the training process, the feature encoding unit and the category mapping unit are initialized first, i.e., some of parameters of the hubert network and the mapping layer are randomly initialized. After the initialization is completed, the model is trained still by using general training data, where the general model data for training may be the same as or different from the samples for the training of the clustering model as described above, and there is no restriction on this.

Figure 4:
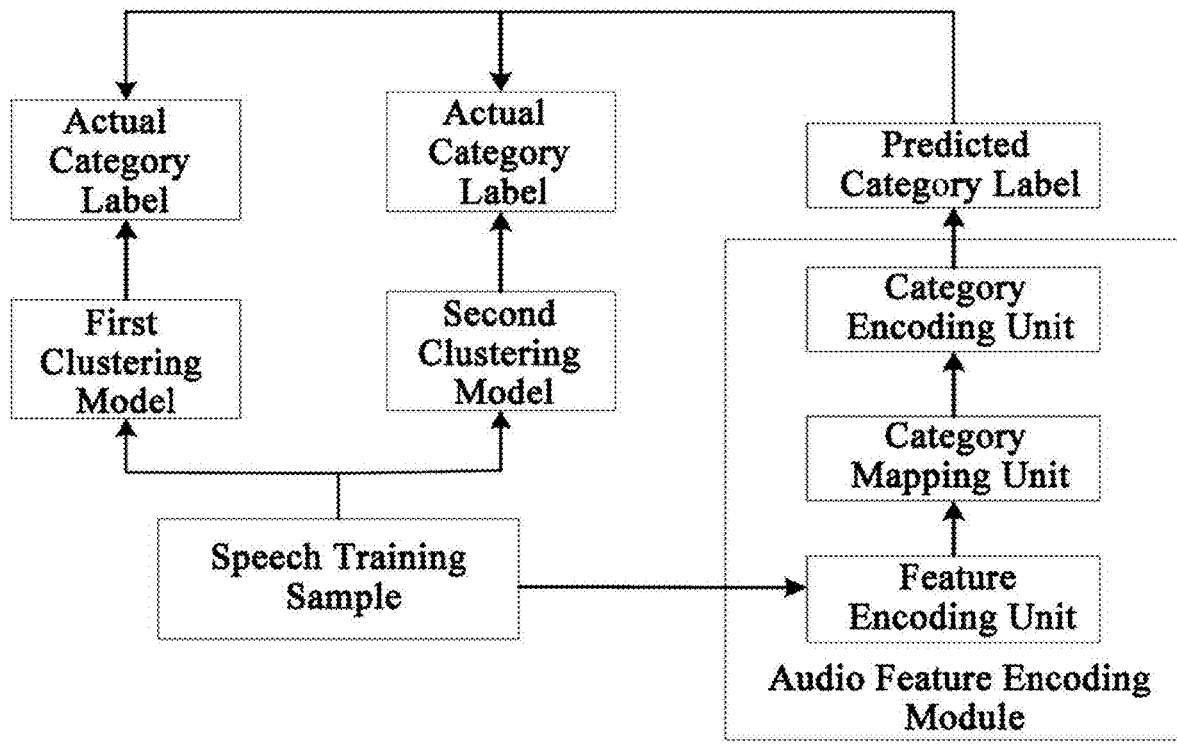
FIG. 4 is a schematic diagram illustrating a training process for an optional audio feature encoding module according to an embodiment of the present application.

FIG. 4 is a schematic diagram illustrating a training process for an optional audio feature encoding module according to an embodiment of the present application. As shown in FIG. 4, in an embodiment, the training the initial audio feature encoding module to convergence based on the actual category labels output from the first clustering model and the second clustering model and the predicted category labels output from the initial audio feature encoding module, includes:

initializing a feature encoding unit and a category mapping unit of the initial audio feature encoding module;

extracting and encoding audio features from the third training samples by the feature encoding unit, and mapping the audio features extracted by the feature encoding unit to the respective category codes by the category mapping unit to, obtain predicted category labels corresponding to the third training samples;

outputting the predicted category labels from the category encoding unit of the initial audio feature encoding module, and training the initial audio feature encoding module to convergence based on the predicted category labels and the actual category labels output from the first clustering model and the second clustering model.

In an embodiment, the training the initial audio feature encoding module to convergence based on the predicted category labels and the actual category labels output from the first clustering model and the second clustering model, comprises:

minimizing a first average cross entropy of the actual category labels output from the first clustering model and the predicted category labels and minimizing a second average cross entropy of the actual category labels output from the second clustering model and the predicted category labels, and updating a loss function for the initial audio feature encoding module based on the minimized first average cross entropy and the minimized second average cross entropy and updating training parameters of the initial audio encoding module.

It should be noted that in the training process of the audio feature encoding module, in addition to the normal training and parameter updating for the feature encoding unit, the audio encoding module in the embodiment of the present application is trained based on both the predicted category codes of the corresponding category codes of the training speech samples and the actual category codes IDs obtained by the aforementioned clustering model. Specifically, the average cross entropy of the actual category codes from hubert's k-means (first clustering model) and the predicted category codes from the audio encoding module is minimized, and the average cross entropy of the actual category codes from wav2vec's k-means (second clustering model) and the predicted category codes from the audio encoding module is minimized, and on basis of this, the above mentioned loss is updated and the parameters of the audio parameters of the audio encoding module are updated. By the above training method, the audio encoding module's ability of categorizing timbre categories is further strengthened.

It should be noted that the aforementioned first clustering model and the second clustering model themselves do not participate in the construction of the audio feature encoding module, but only provide category codes for the audio feature encoding module during the training phase thereof; for the trained audio feature encoding module, the first clustering model and the second clustering model likewise do not participate in the inference operation during the actual voice conversion process. Correspondingly, the above clustering model also does not participate in the subsequent inference.

In another embodiment of the present application, there is also provided a speech conversion apparatus for implementing the speech conversion method in any of the above embodiments, which has already been discussed and will not be repeated herein. The speech conversion apparatus includes:

- a first acquisition module configured to acquire a source speech to be converted and a target speech sample of a target speaker;
- a first extraction module configured to recognize a style category of the target speech sample by an audio feature encoding module, and extract a target audio feature from the target speech sample according to the style category of the target speech sample, wherein the target audio feature includes a textual feature, a prosodic feature and a timbre feature of the target speech sample;
- a second extraction module configured to extract a source audio feature from the source speech by the audio feature encoding module, wherein the source audio feature includes a textual feature, a prosodic feature and a timbre feature of the source speech;
- a second acquisition module configured to acquire a first style feature of the target speech sample by a style feature encoding module and determine a second style feature of the target speech sample according to the first style feature, wherein the first style feature is used to indicate a static voice characteristic of the target speech sample, and the second style feature is used to indicate predicted values for a feature bias amount and a gain amount of the first style feature within a preset duration;
- a fusing and mapping module configured to fuse and map the source audio feature of the source speech, the target audio feature of the target speech sample, and the second style feature of the target speech sample to obtain a joint encoding feature;
- a conversion module configured to decode the joint encoding feature on which a standard streaming operation is performed, to obtain a target speech feature corresponding to a speaking style of the target speaker; and convert the source speech based on the target speech feature to obtain a target speech.

For the problem that the method of performing audio feature extraction directly by a large-scale self-supervised model in the related technology still has certain defects in the style conversion effect, according to an embodiment of the present application, a cluster process is performed, based on a pre-trained clustering model, in a process of the audio feature extraction performed by the audio feature encoding module. When performing feature extraction, through clustering of the features, on a voice of a target speaker which has a strong personalization, the extraction effect of the personalized style of the target speaker may be significantly improved, and accordingly the effect of the subsequent speech conversion may also be improved.

Since the clustering of features in the aforementioned embodiment enables the features extracted for the target speaker to better characterize the voice personalization of the target speaker, on this basis, in order to realize the subsequent voice conversion process, the voice characteristics of the target speaker highlighted by the aforementioned features are further used for speech conversion. According to the embodiments of the present application, in a subsequent speech conversion process, further by improving the timbre conversion portion, the style features may be better adopted to enhance the effect of the timbre conversion.

It is to be noted that, in the embodiment of the present application, the scheme adopted for the style features in the process of timbre conversion is based on the aforementioned clustering of features, that is, just by the clustered features, the encoding of style and the subsequent timbre conversion may be further achieved through the relevant schemes in a style encoding module and in a timbre conversion module.

Another embodiment of the present application also provides an improvement manner for the timbre conversion module, mainly involving enhancing the timbre conversion effect in the timbre conversion process in combination with the style characteristics of the style encoding module.

Figure 5:
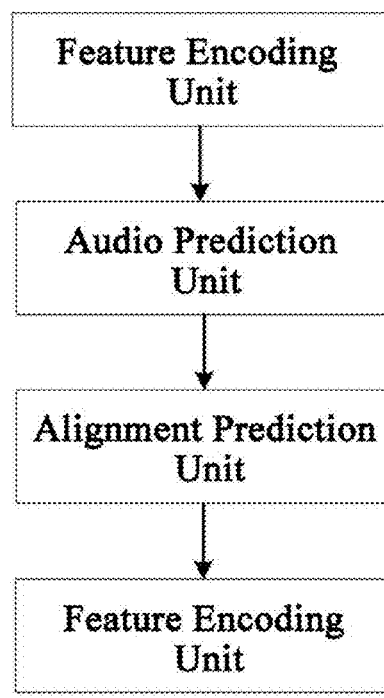
FIG. 5 is a schematic diagram illustrating a structure of an optional timbre conversion module according to an embodiment of the present application.

FIG. 5 is a schematic diagram illustrating a structure of an optional timbre conversion module according to an embodiment of the present application. As shown in FIG. 5, the timbre conversion module includes: a feature encoding unit, a feature decoding unit, an audio prediction unit, and an alignment prediction unit.

In a timbre conversion process, an audio feature encoding module acquires a target speech sample of a target speaker and extracts a target audio feature from the target speech sample according to a style category of the target speech sample; a style feature encoding module acquires a first style feature of the target speech sample and determines a second style feature of the target speech sample according to the first style feature, wherein the first style feature is used to indicate a static voice characteristic of the target speech sample, and the second style feature is used to indicate predicted values for a feature bias amount and a gain amount of the first style feature within a preset duration.

On the basis of the previous processing, training is performed on the timbre conversion module by a way as follow.

- a feature encoding unit configured to fuse the aforementioned target audio feature and the second style feature to obtain a joint encoding feature; and, extract an implicit feature according to the target audio feature;
- a feature decoding unit configured to generate a predicted value of a target speech sample according to the joint encoding feature and the implicit features;
- an audio prediction unit configured to train a first loss function according to the predicted value of the target speech sample and an actual value of the target speech sample, wherein the first loss function is used to indicate a loss of the predicted value of the target speech sample with respect to the actual value;
- an alignment prediction unit configured to perform an alignment process on the joint feature and the implicit feature to calculate an alignment matrix, and train a second loss function according to the alignment matrix, the second loss function being used to indicate a degree of dispersion between the joint feature and the implicit feature.

For the training process of the timbre conversion module, a discrimination unit is further provided, configured to determine a discrimination result according to the difference between the predicted value and the actual value of the target speech sample, and train a third loss function according to the discrimination result, where the timbre conversion module reaches a trained timbre conversion module according to the first loss function, second loss function, and third loss function, and the speech to be processed is converted into the target speech corresponding to the target speaker through the trained timbre conversion module.

It should be noted that, for a piece of audio, during processing it is explicitly known for a part of the features to indicate the timbre and prosody of the audio, then the part of the feature is the aforementioned audio feature; and it is explicitly known for a part of the features to indicate the personal style, then the part of the feature is the aforementioned style feature.

However, it is not known what are interrelations between parts of the features and the indicated objects before training, and it may be only inferred from the results of training of the model that the parts of the features may characterize timbre, prosody, personal style, etc., which are uniformly defined as implicit features here.

Meanwhile, the style encoding module may be used to process a voice style of the speaker, the speech style including a timbre, a prosody of the speaker, and the like. For the input speech, the style encoding module may output corresponding style information (equivalent to the aforementioned second style feature), which style information includes the identity, the prosody of the speaker, and the like. Specifically, the style encoding module includes:

spectrum processing unit (linear spectrogram), including a fully connected layer, configured for acquiring and converting the Mel spectrum of the input speech into a feature sequence.

timing processing unit, including a gated convolution layer and a residual layer, configured for acquiring timing information in a sequence of features;

attention unit configured for extracting the style features corresponding to the respective feature sequences in a first preset duration according to the timing information, which is repeated, where the first preset duration is a short duration at a frame level, and the above operation means that the corresponding style features are extracted respectively in a plurality of short durations; based on this, the plurality of style features corresponding to the plurality of the first preset durations are averaged in a second preset duration to obtain a style vector. Generally speaking, the second preset duration is a long duration, and includes the first preset duration.

a style adaptive unit, including a normalization layer and a fully-connected layer, configured for predicting corresponding feature bias and feature gain, according to the foregoing style vector, as the style information of the speech. In traditional text-to-speech TTS, the style information is determined directly according to the speech; and in the present invention, the style information is adaptively changed according to the change of the style vectors, replicating the styles more accurate and requiring less training samples.

In the training process of the timbre conversion module, the pre-recorded speech of the target speaker is used as the training sample data for the training, and the specific training process of the timbre conversion module is described in detail below.

The loss of the timbre conversion module includes four parts: an audio reconstruction loss, a Kullback-Leibler divergence (KL divergence) loss, an adversarial training loss, and a style adaptive loss. The training process of the timbre conversion module is described below.

Training on Audio Reconstruction Loss:

For the input training sample speech x, a corresponding Mel spectrum $y_{mel}$ (this Mel spectrum refers to an actual Mel spectrum of the training sample speech x) is acquired; meanwhile, a posterior encoder acquires the implicit feature z (black box to better recognize the corresponding speaker) according to the aforementioned Mel spectrum. Finally, the speech $\hat{x}$, i.e., the audio of the target speaker pre-predicted by the timbre conversion module, is acquired by the decoding module, and then an estimated Mel spectrum $\hat{y}_{mel}$ is obtained based on this $\hat{x}$. Based on this, the L1 loss for audio reconstruction is as follows: $l_r = \|y_{mel} - \hat{y}_{mel}\|_1$.

Training on KL Discretization Loss:

The alignment process is performed on the joint encoding feature C obtained by fusing the audio feature code (specifically including a textual feature, a prosodic feature, etc.) output from the audio feature encoding module and the style feature code output from the style encoding module, and the implicit feature z obtained by the target audio passing through the posteriori encoder, to obtain the alignment matrix A, and then the KL dispersion is calculated. KL dispersion loss is expressed as:

$$l_{kl} = \log q_\theta(z|x) - \log q_\phi(z|c, A).$$

It is to be noted that the style feature encoding module is configured to acquire a first style feature of the target speech sample and determine a second style feature of the target speech sample according to the first style feature, wherein the first style feature is used to indicate a static voice characteristic of the target speech sample, and the second style feature is used to indicate predicted values for a feature bias amount and a gain amount of the first style feature within a preset duration.

It is to be noted that in the calculation process of aligning C and z and calculating the alignment matrix A, the embodiment of the present application may adopt a manner of a unidirection and continuity to carry out the alignment calculation. Specifically, a log-likelihood function P for C and z needs to be calculated first, and the log-likelihood function $P_{i,j}$ corresponding to C in a i-th dimension and z in a j-th dimension may be calculated by the log-likelihood function $P_{i, j-1}$ corresponding to C in the i-th dimension and z in a (j−1)-th dimension and the log-likelihood function $P_{i-1, j-1}$ corresponding to C in a (i−1)-th dimension and z in the (j−1)-th dimension. Through the above iterative calculation, an optimal alignment path may be obtained by backtracking calculation under the premise of the determining of the P corresponding to different dimensions, and the alignment matrix A is then obtained.

It should be noted that the above audio feature encoding module is no longer involved in the training of the timbre conversion module after the aforementioned training is completed.

Adversarial Training Loss:

According to embodiments of the present application, based on the above network structure, a discriminator D is added to participate in the training process, and an estimate of G generated by the decoder and the actual audio x are used to calculate the loss.

$$l_{adv}(D) = E_{x,z}\left[(D(x)-1)^2 + D(G(z))^2\right]$$

$$l_{adv}(G) = E_z\left[(D(G(z))-1)^2\right]$$

$$l_{fm}(G) = E_{(x,z)}\left[\sum_{l=1}^{T} \frac{1}{N_l} \|D^l(x) - D^l(G(z))\|_1\right]$$

where T denotes a number of layers of the discriminator network and $D^l$ denotes a feature at a first layer of the discriminator for $N_l$ number of features.

The embodiments of the present application may realize two aspects of improvement for the timbre conversion First, a cluster process is performed, based on a pre-trained clustering model, in a process of the audio feature extraction performed by the audio feature encoding module, improving the quality of the features and the effect of the voice conversion through clustering of the features; second, on the basis of the clustering, the final effect of the timbre conversion is further improved by improving the timbre conversion model; third, the style encoding module may be used to process the speaker's speech style, which includes the speaker's timbre, prosody, etc., where in the process of timbre conversion, after acquiring the style information (the second style feature) of the target speech samples through the style encoding module, the training may be performed better for the target speaker's speech style during the training process; and then in the process of the timbre conversion, the target audio feature and the second style feature are fused to obtain the joint encoding feature, and a further training is performed on the joint encoding feature, so that the style information of the target speaker may be effectively fused into the training process, the trained model may effectively recognize the speaking style of the target speaker, and the source speech to be converted may be converted in accordance with the speaking style of the target speaker, effectively reproduce the timbre of the target speaker.

Figure 6:
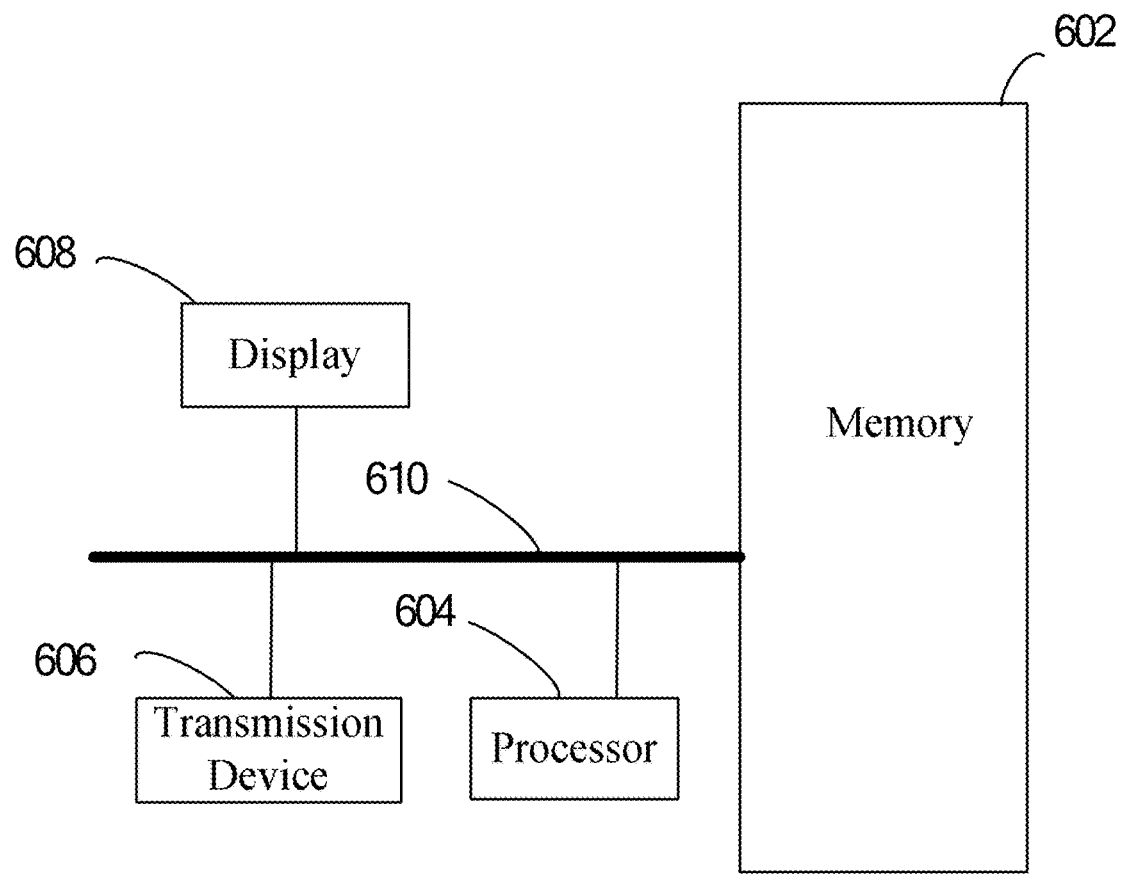
FIG. 6 is a schematic diagram illustrating a structure of an optional electronic device according to an embodiment of the present application.

According to yet another aspect of embodiments of the present application, there is also provided an electronic device for implementing the above-described speech conversion method. The above-described electronic device may be, but is not limited to, applied in a server. As shown in FIG. 6, the electronic device includes a memory 602 in which a computer program is stored and a processor 604 configured to perform the steps in any of the above-described embodiments of method by the computer program.

Optionally, in this embodiment, the electronic device may be located in at least one of a plurality of network devices of a computer network.

Optionally, in this embodiment, the above processor may be configured to perform, by a computer program, the following steps:

S1, acquiring a source speech to be converted and a target speech sample of a target speaker;

S2, recognizing a style category of the target speech sample by an audio feature encoding module, and extracting a target audio feature from the target speech sample according to the style category of the target speech sample, wherein the target audio feature includes a textual feature, a prosodic feature and a timbre feature of the target speech sample;

S3, extracting a source audio feature from the source speech by the audio feature encoding module, wherein the source audio feature includes a textual feature, a prosodic feature and a timbre feature of the source speech;

S4, acquiring a first style feature of the target speech sample by a style feature encoding module and determining a second style feature of the target speech sample according to the first style feature, wherein the first style feature is used to indicate a static voice characteristic of the target speech sample, and the second style feature is used to indicate predicted values for a feature bias amount and a gain amount of the first style feature within a preset duration;

S5, fusing and mapping the source audio feature of the source speech, the target audio feature of the target speech sample, and the second style feature of the target speech sample to obtain a joint encoding feature;

S6, decoding the joint encoding feature on which a standard streaming operation is performed, to obtain a target speech feature corresponding to a speaking style of the target speaker, and converting the source speech based on the target speech feature to obtain a target speech.

Optionally, a person of ordinary skill in the art may understand that the structure shown in FIG. 6 is only schematic, and that the electronic device may also be a smartphone, a tablet computer, a PDA, and a terminal device such as Mobile Internet Devices (MIDs), PADs, and the like. FIG. 6 does not limit the structure of the above-described electronic device. For example, the electronic device may also include more or fewer components (e.g., network interfaces, etc.) than shown in FIG. 6, or have a different configuration from shown in FIG. 6.

Where the memory 602 may be used to store software programs as well as modules, such as program instructions/modules corresponding to the speech conversion method and apparatus in the embodiments of the present application, and the processor 604 performs various functional applications as well as data processing, i.e., implements the above-described speech conversion method, by executing the software programs as well as modules stored in the memory 602. The memory 602 may include a high-speed random memory, and may also include a non-volatile memory, such as one or more magnetic memory devices, flash memory, or other non-volatile solid state memory. In some examples, the memory 602 may further include memories set remotely relative to the processor 604, and these remote memories may be connected to the terminal via a network. Examples of the networks include, but are not limited to, the Internet, an enterprise intranet, a local area network, a mobile communications network, and combinations thereof. Among other things, the memory 602 may specifically, but is not limited to, be used to store steps of program of the speech conversion method. As an example, as shown in FIG. 6, the aforementioned memory 602 may, but is not limited to, include a neural network filter, a neural network encoder, an activation function output layer, and the like in the aforementioned speech recognition neural network model. In addition, other modular units in the above-described speech recognition neural network model may also be included, but are not limited to, and will not be repeated in this example.

Optionally, the transmission device 606 described above is used to receive or transmit data via a network. Specific examples of the network described above may include a wired network and a wireless network. In one example, the transmission device 606 includes a network adaptor (Network Interface Controller (NIC)) that may be connected to other network devices and routers through a network cable to communicate with the Internet or a local area network. In one example, the transmission device 606 is a radio frequency (RF) module for communicating wirelessly with the Internet.

In addition, the above-described electronic device further includes: a display 608 for displaying the input and output information of the speech conversion; and a connection bus 610 for connecting the various modular components in the above-described electronic device.

Embodiments of the present application also provide a computer-readable storage medium on which a computer program is stored, wherein the computer program is configured to perform, when be executed, the steps in any of the above embodiments of the methods.

Optionally, in this embodiment, the storage medium described above may be provided to store a computer program for performing the following steps:

S1, acquiring a source speech to be converted and a target speech sample of a target speaker;

S2, recognizing a style category of the target speech sample by the audio feature encoding module, and extracting a target audio feature from the target speech sample according to the style category of the target speech sample, wherein the target audio feature includes a textual feature, a prosodic feature and a timbre feature of the target speech sample;

S3, extracting a source audio feature from the source speech by the audio feature encoding module, wherein the source audio feature includes a textual feature, a prosodic feature and a timbre feature of the source speech;

S4, acquiring a first style feature of the target speech sample by a style feature encoding module and determining a second style feature of the target speech sample according to the first style feature, wherein the first style feature is used to indicate a static voice characteristic of the target speech sample, and the second style feature is used to indicate predicted values for a feature bias amount and a gain amount of the first style feature within a preset duration;

S5, fusing and mapping the source audio feature of the source speech, the target audio feature of the target speech sample, and the second style feature of the target speech sample to obtain a joint encoding feature;

S6, decoding the joint encoding feature on which a standard streaming operation is performed, to obtain a target speech feature corresponding to a speaking style of the target speaker, and converting the source speech based on the target speech feature to obtain a target speech.

Optionally, a storage medium is further provided for storing a computer program for performing the steps included in the method of the above embodiment, which will not be repeated in this embodiment.

Optionally, in this embodiment, a person of ordinary skill in the art may understand that all or some of the steps in the various methods of the above embodiments may be accomplished by instructing the hardware associated with the terminal device through a program, which may be stored in a computer-readable storage medium, and the computer-readable storage medium may include: a flash disk, Read-Only Memory (ROM), Random Access Memory (RAM), a disk or a CD-ROM, etc.

The serial numbers of the above embodiments of this application are for descriptive purposes only and do not represent the advantages or disadvantages of the embodiments.

The unit integrated in the above embodiment may be stored in the above-described computer-readable storage medium if it is implemented in the form of a software function unit and sold or used as a separate product. Based on this understanding, the technical solution of the present application in essence or a part as a contribution to the prior art, or a whole or a part of the technical solution, may be embodied in the form of a software product, stored in a storage medium, comprising instructions for causing one or more computer devices (which may be personal computers, servers or network devices, etc.) to perform all or some of the steps of the method described in the various embodiments of the present application.

In the above embodiments of the present application, the description of each embodiment has its own focus, and a part that is not detailed in a certain embodiment may refer to the relevant description of that in other embodiments.

In the several embodiments provided in the present application, it should be understood that the disclosed client may be realized in other ways. Among other things, the above-described embodiments of the devices are merely schematic, for example, the division of the units described is merely a logical functional division, and there may be other division ways in the actual implementation. For example, a plurality of units or components may be combined or may be integrated into another system, or some features may be ignored, or not implemented. Furthermore, the mutual coupling or direct coupling or communication connection shown or discussed may be indirect coupling or communication connection between units or modules through some interfaces, which may be electrical or otherwise.

The units illustrated as separated components may or may not be physically separated, and components shown as units may or may not be physical units, that is, they may be located in one place, or may also be distributed onto a plurality of network units. Some or all of these units may be selected to fulfill the purpose of this embodiment scheme depending on actual needs.

In addition, all of functional units in various embodiments of the present application may be integrated in a processing unit, or each unit may physically exist separately, or two or more units may be integrated in a single unit. The above integrated units may be implemented either in the form of hardware or in the form of software functional units.

The foregoing is only a preferred embodiment of the present application, and it should be noted that, for a person of ordinary skill in the art, some improvements and modifications may be made without departing from the principles of the present application, and these improvements and modifications shall also be regarded as falling into the scope of protection of the present application.

What is claimed is:

1. A speech conversion method comprising:
   acquiring a source speech to be converted and a target speech sample of a target speaker;
   recognizing a style category of the target speech sample by an audio feature encoding module, and extracting a target audio feature from the target speech sample according to the style category of the target speech sample, wherein the target audio feature includes a textual feature, a prosodic feature and a timbre feature of the target speech sample;
   extracting a source audio feature from the source speech by the audio feature encoding module, wherein the source audio feature includes a textual feature, a prosodic feature and a timbre feature of the source speech;
   acquiring a first style feature of the target speech sample by a style feature encoding module and determining a second style feature of the target speech sample according to the first style feature, wherein the first style feature is used to indicate a static voice characteristic of the target speech sample, and the second style feature is used to indicate predicted values for a feature bias amount and a gain amount of the first style feature within a preset duration;
   fusing and mapping the source audio feature of the source speech, the target audio feature of the target speech sample, and the second style feature of the target speech sample to obtain a joint encoding feature; and decoding the joint encoding feature on which a standard streaming operation is performed, to obtain a target speech feature corresponding to a speaking style of the target speaker, and converting the source speech based on the target speech feature to obtain a target speech, wherein, before the extracting audio features from the source speech by the audio feature encoding module, the method further comprises:

training a first clustering model by using first training samples, wherein the first training samples include speech samples of a plurality of speakers, and the speech samples of the plurality of speakers correspond to different style types, and wherein the first clustering model is configured for clustering the first training samples and determining, according to a result of the clustering, category labels corresponding to the first training samples;

training a second clustering model by using second training samples, wherein the second training samples include speech samples of a plurality of speakers, and the speech samples of the plurality of speakers correspond to different style types, and wherein the second clustering model is configured for clustering the second training samples and determining, according to a result of the clustering, category labels corresponding to the second training samples, the first clustering model and the second clustering model using different structures of feature extractors to perform clustering from different dimensions;

inputting third training samples into the trained first clustering model, the trained second clustering model, and an initial audio feature encoding module, wherein the third training samples include speech samples of a plurality of speakers; and training the initial audio feature encoding module according to a loss function for the initial audio feature encoding module, and training the initial audio feature encoding module to convergence according to actual category labels output from the first clustering model and the second clustering model and the predicted category labels output from the initial audio feature encoding module to obtain the audio feature encoding module, wherein the audio feature encoding module is configured for performing audio feature extraction based on the style type of speech.

2. The speech conversion method as claimed in claim 1, wherein the training the initial audio feature encoding module according to a loss function for the initial audio feature encoding module comprises:

training the initial audio feature encoding module by a formula of a loss function as follows:

$$p(d_t = i|s_t) = \frac{\exp(\text{sim}(s_t, e_i)/\tau)}{\sum_{k=1}^{K} \exp(\text{sim}(s_t, e_k)/\tau)}$$

where p denotes a probability, i denotes an identity of the clustering category, $s_t$ denotes a target vector, $d_t$ denotes a probability that a current feature vector satisfies the target vector and belongs to a category i, $e_i$ denotes a trainable feature vector under the current category i, sim (·,·) denotes calculation of cosine similarity, $\tau$ denotes a hyperparameter, K denotes a number of clustering categories, and $e_k$ denotes a trainable feature vector under clustering category k.

3. The speech conversion method as claimed in claim 1, wherein the training the initial audio feature encoding module to convergence based on the actual category labels output from the first clustering model and the second clustering model and the predicted category labels output from the initial audio feature encoding module comprises:

initializing a feature encoding unit and a category mapping unit of the initial audio feature encoding module;

extracting and encoding audio features from the third training samples by the feature encoding unit, and mapping the audio features extracted by the feature encoding unit to the respective category codes by the category mapping unit to, obtain predicted category labels corresponding to the third training samples; and outputting the predicted category labels from the category encoding unit of the initial audio feature encoding module, and training the initial audio feature encoding module to convergence based on the predicted category labels and the actual category labels output from the first clustering model and the second clustering model.

4. The speech conversion method as claimed in claim 3, wherein the training the initial audio feature encoding module to convergence based on the predicted category labels and the actual category labels output from the first clustering model and the second clustering model comprises:

minimizing a first average cross entropy of the actual category labels output from the first clustering model and the predicted category labels and minimizing a second average cross entropy of the actual category labels output from the second clustering model and the predicted category labels, and updating a loss function for the initial audio feature encoding module based on the minimized first average cross entropy and the minimized second average cross entropy and updating training parameters of the initial audio encoding module.

5. A non-transitory computer-readable storage medium, on which a computer program is stored, wherein the computer program is configured to perform, when being executed, the method as claimed in claim 1.

6. An electronic device comprising a memory on which a computer program is stored and a processor, wherein the processor is configured to execute the computer program to perform the method claimed in claim 1.

7. A speech conversion apparatus comprising:

a first acquisition module configured to acquire a source speech to be converted and a target speech sample of a target speaker;

a first extraction module configured to recognize a style category of the target speech sample by an audio feature encoding module, and extract a target audio feature from the target speech sample according to the style category of the target speech sample, wherein the target audio feature includes a textual feature, a prosodic feature and a timbre feature of the target speech sample;

a second extraction module configured to extract a source audio feature from the source speech by the audio feature encoding module, wherein the source audio feature includes a textual feature, a prosodic feature and a timbre feature of the source speech;

a second acquisition module configured to acquire a first style feature of the target speech sample by a style feature encoding module and determine a second style feature of the target speech sample according to the first style feature, wherein the first style feature is used to indicate a static voice characteristic of the target speech sample, and the second style feature is used to indicate predicted values for a feature bias amount and a gain amount of the first style feature within a preset duration;

a fusing and mapping module configured to fuse and map the source audio feature of the source speech, the target audio feature of the target speech sample, and the second style feature of the target speech sample to obtain a joint encoding feature;

a conversion module configured to decode the joint encoding feature on which a standard streaming operation is performed, to obtain a target speech feature corresponding to a speaking style of the target speaker; and convert the source speech based on the target speech feature to obtain a target speech;

a training module configured to: train a first clustering model by using first training samples, wherein the first training samples include speech samples of a plurality of speakers, and the speech samples of the plurality of speakers correspond to different style types, and wherein the first clustering model is configured for clustering the first training samples and determining, according to a result of the clustering, category labels corresponding to the first training samples;

train a second clustering model by using second training samples, wherein the second training samples include speech samples of a plurality of speakers, and the speech samples of the plurality of speakers correspond to different style types, and wherein the second clustering model is configured for clustering the second training samples and determining, according to a result of the clustering, category labels corresponding to the second training samples, the first clustering model and the second clustering model using different structures of feature extractors to perform clustering from different dimensions;

input third training samples into the trained first clustering model, the trained second clustering model, and an initial audio feature encoding module, wherein the third training samples include speech samples of a plurality of speakers; and train the initial audio feature encoding module according to a loss function for the initial audio feature encoding module, and training the initial audio feature encoding module to convergence according to actual category labels output from the first clustering model and the second clustering model and the predicted category labels output from the initial audio feature encoding module to obtain the audio feature encoding module, wherein the audio feature encoding module is configured for performing audio feature extraction based on the style type of speech.

* * * * *